(12) United States Patent
Nagata et al.

(10) Patent No.: US 7,185,822 B2
(45) Date of Patent: Mar. 6, 2007

(54) IC CARD READER

(75) Inventors: Shigeyuki Nagata, Nagano (JP); Toshio Tatai, Nagano (JP); Kazunori Takahashi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 321 days.

(21) Appl. No.: 10/496,047

(22) PCT Filed: Nov. 20, 2002

(86) PCT No.: PCT/JP02/12129

§ 371 (c)(1),
(2), (4) Date: May 19, 2004

(87) PCT Pub. No.: WO03/044731

PCT Pub. Date: May 30, 2003

(65) Prior Publication Data
US 2004/0262389 A1    Dec. 30, 2004

(30) Foreign Application Priority Data
Nov. 22, 2001   (JP) .............................. 2001-358385

(51) Int. Cl.
*G06K 19/06* (2006.01)
(52) U.S. Cl. ...................... 235/492; 235/483
(58) Field of Classification Search ................ 235/482, 235/492, 483, 380, 435
See application file for complete search history.

(56) References Cited

U.S. PATENT DOCUMENTS 4,839,509 A * 6/1989 Yasuma et al. .............. 235/482

FOREIGN PATENT DOCUMENTS

| DE | 3916783    | 4/1990  |
|----|------------|---------|
| DE | 9400348    | 5/1994  |
| EP | 0295607    | 12/1988 |
| EP | 0767440    | 4/1997  |
| EP | 0945816    | 9/1999  |
| JP | 02-213990  | 8/1990  |
| JP | 07-014014  | 1/1995  |
| JP | 07-175897  | 7/1995  |
| JP | 08-315088  | 11/1996 |
| JP | 10-255008  | 9/1998  |

* cited by examiner

*Primary Examiner*—Lisa M. Caputo
(74) *Attorney, Agent, or Firm*—Notaro & Michalos P.C.

(57) ABSTRACT

An IC card reader holding an IC card by using an IC contact block and a card receiving member at a data communication position, and preventing a sudden increase in load when inserting the card. A card receiving member (13) is entirely or partially moved in a card carriage direction together with an IC card (5) when inserting or removing the IC card (5), and the IC card (5) is received and supported from a rear surface side thereof when at least IC contact springs (11) are in contact with a surface of the IC card (5), thereby suppressing a sudden increase in insertion load in the middle of the card insertion operation.

4 Claims, 13 Drawing Sheets

IC CARD READER

TECHNICAL FIELD

The present invention relates to an IC card reader. More particularly, the present invention relates to an improvement in a structure of an IC card reader which is configured to perform data communication after an IC card is inserted by a user himself/herself and then fed to a data communication position or automatically moved to the data communication position.

TECHNICAL TERMS

In this specification, a term "card insertion direction" means a carriage direction when an IC card inserted from a card insertion opening on an IC card reader front side is carried to a data communication position on a card reader inner side. Further, a term "card return direction" means a direction opposite to the card insertion direction, i.e., a carriage direction when the IC card is returned from the data communication position to the card insertion opening. The term "return" in this case means that the IC card is manually or automatically carried from the data communication position to the card insertion opening side. Furthermore, the term "data communication position" means that a definite stop position of the IC card when IC contact springs in an IC contact block are brought into contact with a contact terminal pattern of the IC card in order to perform data communication, and this will be referred to as a "card stop position" in this specification. The card insertion direction and the card return direction collectively mean a "card carriage direction".

BACKGROUND ART

As an IC card reader, there has been utilized a manual type IC card reader that an IC card is manually inserted, an IC contact block is moved by using a force at the time of insertion and IC contact springs are brought into contact with a contact terminal pattern of the IC card.

For example, in a manual type IC card reader shown in FIGS. 21 and 22, an IC contact block 101 is supported by arms 102 and 103 so as to be capable of moving closer to or away from an IC card 105 which travels in a card traveling path 104, and pressed by a return spring 106 in a card return direction. A pressure receiving portion 108 with which an end of the IC card 105 is brought into contact is formed to this IC contact block 101. Therefore, when the IC card 105 is inserted into the manual type IC card reader, the IC card 105 comes into contact with the pressure receiving portion 108, then the IC contact block 101 gradually moves closer to this IC card 105 while moving together with the IC card 105, thereby bringing IC contact springs 107 into contact with a contact terminal pattern 112 on the IC card 105. In this case, since a relative position of the IC card 105 which has come into contact with the pressure receiving portion 108 with respect to the IC contact block 101 is fixed, the IC contact springs 107 of the IC contact block 101 correctly come into contact with predetermined contact positions on the contact terminal pattern 112. Furthermore, the IC contact springs 107 are elastically deformed and press the surface of the IC card 105. A rear surface side of the pressed IC card 105 is received and supported by a card receiving surface 109 of a card receiving member formed to a frame of the IC card reader. It is to be noted that reference numerals 111 in the drawings denote a foreign particle discharge opening.

In the above-described manual type IC card reader, however, there is a problem that a frictional resistance acting on the IC card 105 is increased as the IC card 105 is inserted. That is, when the IC contact block 101 is moved down by an operation of inserting the IC card 105, a force to press the surface of the IC card 105 is gradually increased as the IC contact block 101 moves down, and a frictional force generated between the rear surface of the IC card 105 and the card receiving surface 109 is increased, which results in an increase in resistance.

Like an example of fluctuations in a card operating force in a conventional card reader shown in FIG. 8, even if an insertion load of the IC card 105 to the vicinity of the IC contact springs 107 is small (e.g., an insertion load is slightly larger than a pad pressure of a magnetic head 110 when the card reader functions as both an IC card reader and a magnetic card reader), the IC card 105 is gradually strongly pressed against the card receiving surface 109 as the IC contact block 101 moves down after a contact start point a where the IC contact springs 107 of the IC contact block 101 come into contact with the IC card 105. In this case, the frictional force is suddenly increased as shown in the drawing, and an operational feeling when inserting the card is deteriorated.

Moreover, when a user misdeems a completion of insertion of the card upon feeling an increase in an insertion load in the middle of insertion of the card and he/she discontinues insertion of the IC card 105, not only an excellent contact between the contact terminal pattern 112 of the IC card 105 and the IC contact springs 107 cannot be obtained, but the IC contact springs 107 cannot come into contact with appropriate positions on the contact terminal pattern 112, which can be a factor of a malfunction.

It is an object of the present invention to provide an IC card reader which suppresses a sudden increase in an insertion load in the middle of a card insertion operation.

DISCLOSURE OF THE INVENTION

To achieve this aim, according to the present invention, there is provided an IC card reader in which an IC contact block is moved closer to a card traveling path with an insertion operation of an IC card which is inserted to a card stop position from a card insertion opening formed on a frame front side, IC contact springs are brought into contact with a contact terminal pattern on an IC card surface, and the IC card with which the IC contact springs are in contact is received and supported from a rear surface side thereof by a card receiving member, wherein the card receiving member opposed to the IC contact block with the card traveling path therebetween moves in a card carriage direction together with the IC card at the time of an IC card insertion operation and an IC card return operation, and receives and supports the IC card from the rear surface side when at least the IC contact springs are in contact with the IC card surface.

In a conventional IC card reader, a rear surface side of an IC card against which IC contact springs are pressed is received and supported by a card receiving member such as a fixed card receiving surface formed to, e.g., a frame. In the present invention, however, a card receiving member which can move in a card carriage direction and moves together with the IC card is provided, and this card receiving member moves together with this IC card while receiving and supporting the IC card rear surface. Therefore, no friction is generated between the IC card rear surface and the card receiving member. Accordingly, even if the IC contact springs are pressed against the IC card in the middle of the card insertion operation, an insertion load is not suddenly increased. Therefore, if the IC card reader is of a manual type, a card operational feeling for a user is improved. Additionally, it is possible to prevent a user from interrupting an operation in the middle of insertion of the card.

It is preferable that this card receiving member is provided in such a manner that the card receiving member moves closer to the rear surface of the IC card with the IC card insertion operation and moves away from the rear surface of the IC card with the IC card return operation. In such a case, the card rear surface can be received and supported by moving this card receiving member closer to the card rear surface only when inserting the IC card. Further, the IC contact block which likewise moves closer/away with respect to the IC card and this card receiving member can be used to receive and support the card rear surface so as to substantially simultaneously hold the IC card from the front surface side and the rear surface side, while the IC contact springs can be brought into contact with the contact terminal pattern.

In this case, it is preferable that a pressure receiving portion with which an end of the IC card comes into contact and a pressing portion which comes into contact with the card receiving member are formed to the IC contact block, a pressure receiving portion with which this pressing portion comes into contact is formed to this card receiving member, and the pressure receiving portion of the card receiving member is arranged at a position away from the pressing portion of the IC contact block in the card insertion direction. In this case, a time difference is generated in timing between start of movement of the IC contact block and start of movement of the card receiving member, and the card insertion load is gradually gently increased. Therefore, if the IC card reader is of a manual type, the insertion load is not suddenly increased, and a card operational feeling felt by a user is improved. Furthermore, a probability that a magnetic read error is generated is lowered since the card insertion load is gently changed, and an insertion load increase is not taken for completion of insertion.

Moreover, it is preferable that the pressure receiving portion of the card receiving member is provided in the vicinity of the card stop position. In this case, since the card receiving member enters a card receiving state immediately before completion of the card insertion, a user can bring the insertion operation to completion without feeling that the insertion load is increased if the IC card reader is of a manual type. It is to be noted that this "card receiving state" means a state or an attitude of the card receiving member when the IC card carried to the card stop position is received and supported from the rear surface side.

Additionally, according to the present invention, there is provided the IC card reader in which the IC contact block is moved closer to the card traveling path with an insertion operation of the IC card which is inserted to the card stop position from the card insertion opening formed on the frame front side, the IC contact springs are brought into contact with the contact terminal pattern on the IC card surface, and the IC card with which the IC contact springs are in contact is received and supported from a rear surface side thereof by the card receiving member, wherein the card receiving member opposed to the IC contact block with the card traveling path therebetween is provided so as to be capable of rotating around a supporting point on the frame at the time of an IC card insertion operation and an IC card return operation, and receives and supports the IC card from the rear surface side when at least the IC contact springs are in contact with the IC card surface; the pressure receiving portion with which an end of the IC card comes into contact and the pressing portion which comes into contact with the card receiving member are formed to the IC contact block; the pressure receiving portion with which this pressing portion comes into contact is formed to the card receiving member; and the pressure receiving portion of the card receiving member is arranged at a position away from the pressing portion of the IC contact block in the card insertion direction. Further, at least a part of the pressing portion of the IC contact block which comes into contact with the pressure receiving portion of the card receiving member is so provided that the pressure receiving portion of the card receiving member can move onto the part and the part is a horizontal surface which does not produce a component force in the card return direction which acts on the IC contact block from the card receiving member when the IC card stops at the card stop position. In this case, a force that an IC contact pressure and an elastic force of the return spring act on the card receiving member, which is specifically a moment which returns the card receiving member to its original position is prevented from generating a component force in the card carriage direction when transmitted to the IC contact block, and it does not act as a force which pushes back the IC contact block. Therefore, the IC contact block can stay in a state that the IC card is stopped at the card stop position, and can keep holding the completely inserted IC card at this card stop position.

In this case, it is preferable that a cam surface which is formed of an inclined surface and a horizontal surface and guides the pressure receiving portion of the card receiving member is formed to the pressing portion of the IC contact block, and a follower which is in contact with the cam surface and guided is formed to the pressure receiving portion of this card receiving member. The card receiving member rotates until it enters the card receiving state by a wedge effect of the inclined surface, and receives and supports the IC card inserted to the card stop position from the rear surface side.

Furthermore, it is preferable that a part of the follower which is in contact with the cam surface is a curved surface. A contact surface which is a curved surface reduces a contact area with the pressure receiving surface of the card receiving member, and alleviates a resistance received when sliding. Therefore, the IC contact block can further lightly rotate the card receiving member by the wedge effect of the cam surface.

In this case, it is preferable that the follower is formed of a roller. The follower constituted of the roller can reduce a sliding resistance with the cam surface and further lightly rotate the card receiving member.

BEST MODE FOR CARRYING OUT OF THE INVENTION

Figure 1:
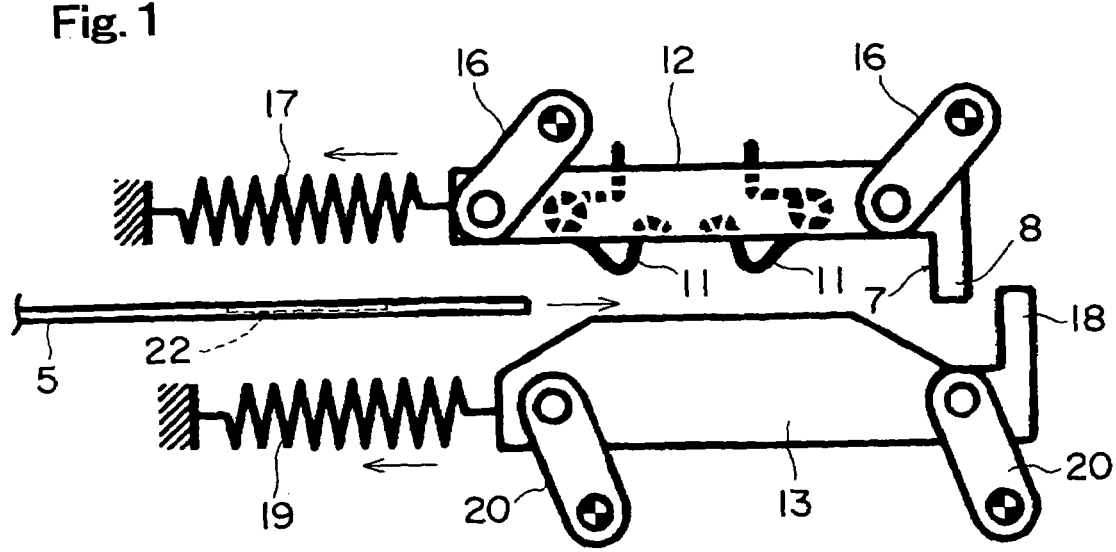
FIG. 1 is a view showing a first embodiment according to the present invention, which is a schematic view showing an inside of an IC card reader which is in a retired state.

A structure of the present invention will now be described hereinafter in detail based on the best mode illustrated in the accompanying drawings.

FIGS. 1 to 5 show a first embodiment according to the present invention. An IC card reader 1 according to this embodiment is of a manual type. With an operation to insert an IC card 5 which is inserted to a card stop position 6 from a card insertion opening 3, an IC contact block 12 is moved closer to a card traveling path 14, and IC contact springs 11 are brought into contact with a contact terminal pattern 22 on a surface of the IC card 5. Further, the IC card reader 1 includes a card receiving member 13 which receives and supports the IC card 5 with which the IC contact springs 11 have been in contact from a rear surface side thereof and can move in a card carriage direction so as to move together with this IC card 5 at the time of insertion and removal of the IC card 5. The card stop position 6 described herein means a stop position of the IC card 5 when data communication is performed with respect to the IC card 5 on the innermost side of the card traveling path 14. This position is set in such a manner that the IC contact springs 11 correctly come into contact with predetermined positions on the contact terminal pattern 22 when the IC card 5 stops at this card stop position 6.

Furthermore, the IC card reader 1 includes a card insertion/removal concave portion 4 on a card return direction side of a frame 2 forming the card insertion opening 3. The concave portion 4 in this case means a concave part which is provided to the frame 2 and recessed in a card return direction so that the IC card 5 can be inserted/removed while holding the IC card 5 with fingers (see FIG. 5). In the IC card reader 1 including the concave portion 4 according to this embodiment, a user can insert the IC card 5 to the inner part while holding both sides of the card with fingers or pushing a card edge with fingers, and he/she can pinch and pull out the IC card 5 partially protruding from the card insertion opening 3. It is to be noted that a shape of the concave portion 4 is not restricted to that illustrated in this embodiment, and any shape can be adopted as long as it enables or facilitates insertion/removal of the IC card 5. Guide portions 9 which can be traveling guides of the IC card 5 when inserting the card are provided on both sides of this concave portion 4 (see FIG. 5). Each guide portion 9 is formed of a groove which guides a side portion of the IC card 5. Even if the inserted IC card 5 is bent, the guide portions 9 enable insertion while correcting this bend. Moreover, a narrow opening of the concave portion 4 of the card traveling path 14 on the inner side is the card insertion opening 3.

Additionally, the IC card reader 1 according to this embodiment includes a magnetic head 21 which can read magnetic data recorded on a magnetic stripe when the IC card 5 is a card including the magnetic stripe. Although the magnetic head 21 according to this embodiment reads card information and also detects insertion of the IC card 5, insertion of the card may be detected by a front sensor or the like to which a lever mode is adopted and which is capable of swinging.

Figure 2:
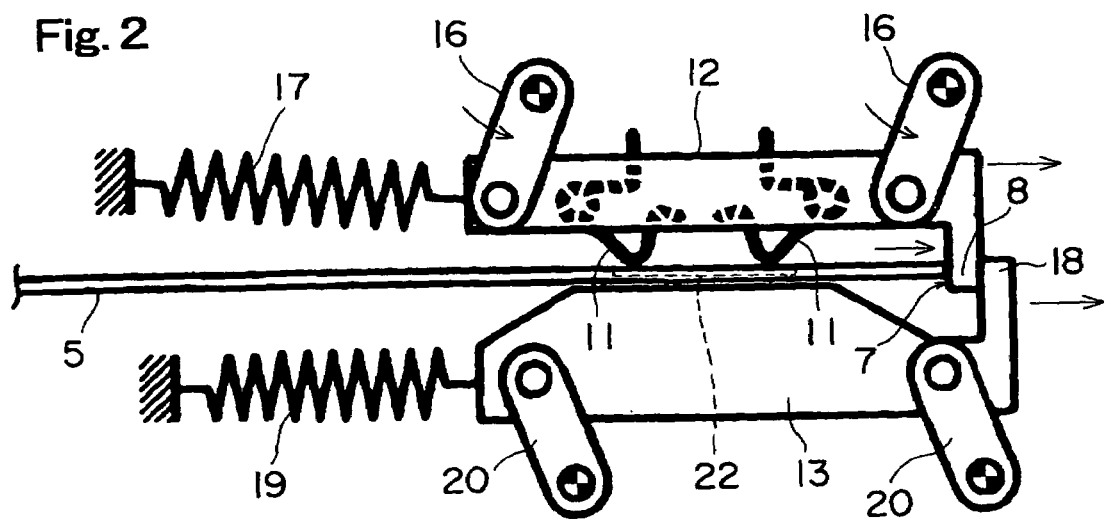
FIG. 2 is a schematic view showing the inside of the IC card reader in the middle of a card insertion operation.

An IC contact block 12 is supported so as to suspended at, e.g., four corners thereof by four arms 16, and provided so as to move down and approach the card traveling path 14 with movement in the card insertion direction (see FIG. 2). Further, the IC contact block 12 includes a pressure receiving portion 7 which protrudes substantially right down toward the card traveling path 14 and a pressing portion 8. The pressure receiving portion 7 protrudes at least to the card traveling path 14 in such a manner that an end of the IC card 5 comes into contact with this pressure receiving portion 7. The pressing portion 8 is provided so as to come into contact with a part of the card receiving member 13 (which is specifically a pressure receiving portion 18) in the middle of movement in the card insertion direction. In this embodiment, although a front side (card return direction side) portion of a part protruding to the card traveling path 14 side serves as the pressure receiving portion 7 and an inner side (card insertion direction side) portion of the same functions as the pressing portion 8 (see FIG. 1 and others), two protruding portions may be separately provided as the pressure receiving portion 7 and the pressing portion 8, for example. When this IC contact block 12 moves down, the IC contact springs 11 come into contact with the contact terminal pattern 22 on the IC card 5 and are elastically deformed. On the other hand, in a state before the IC card 5 is inserted, the IC contact block 12 is pulled in the card return direction by a return spring 17 and retired from the card traveling path 14 (see FIG. 1).

Figure 3:
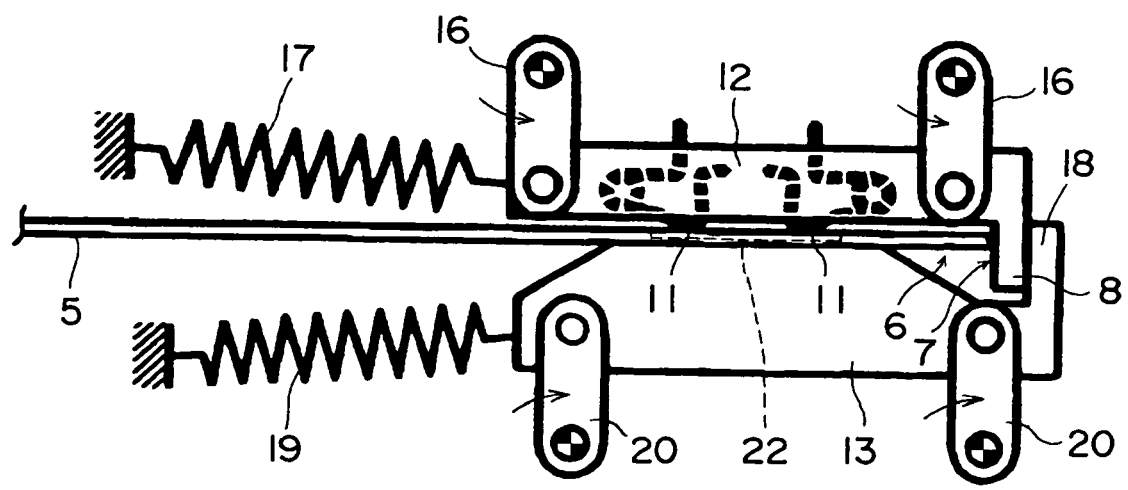
FIG. 3 is a schematic view showing the inside of the IC card reader which is in a contact state.
Figure 4:
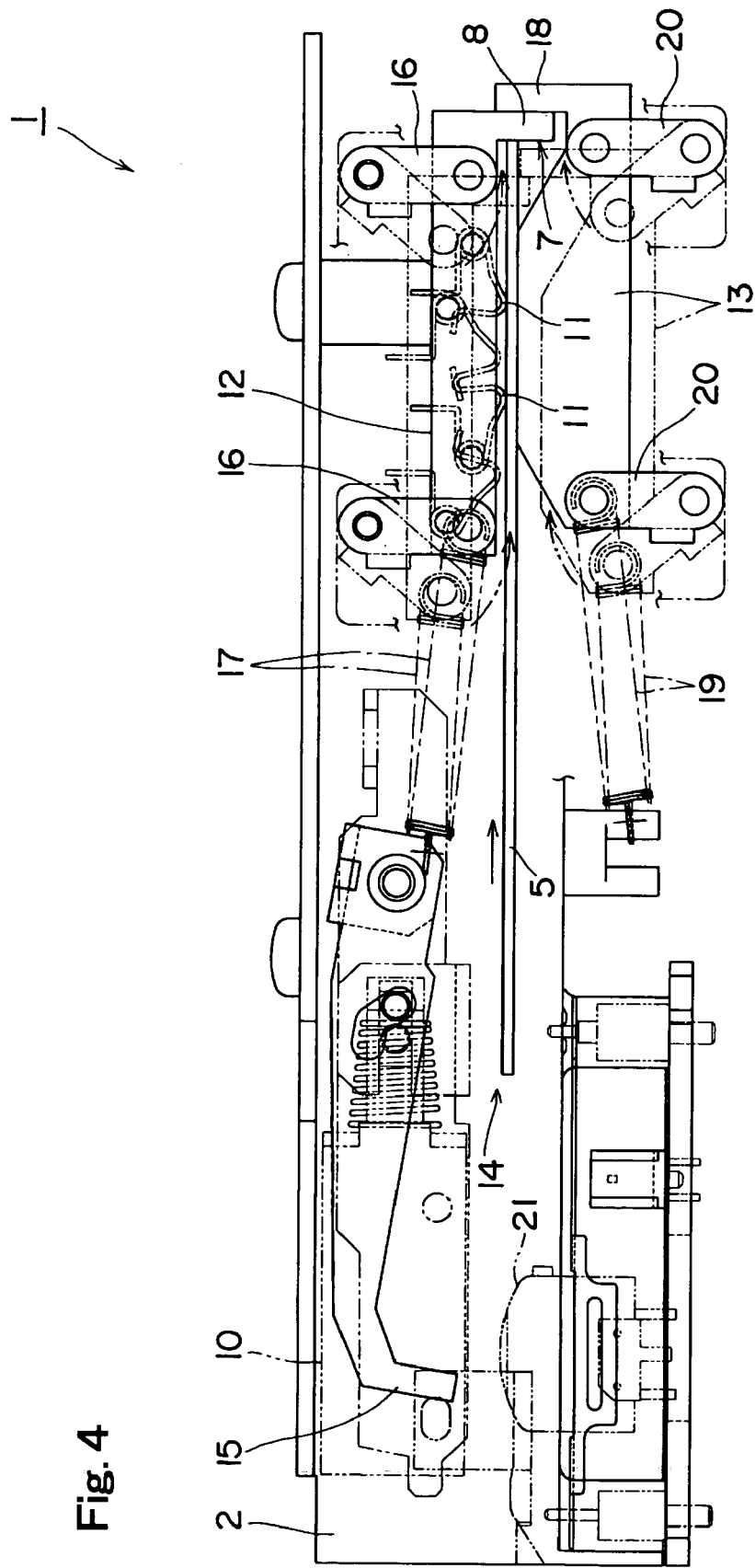
FIG. 4 is a side view showing a schematic structure of a manual type IC card reader.
Figure 5:
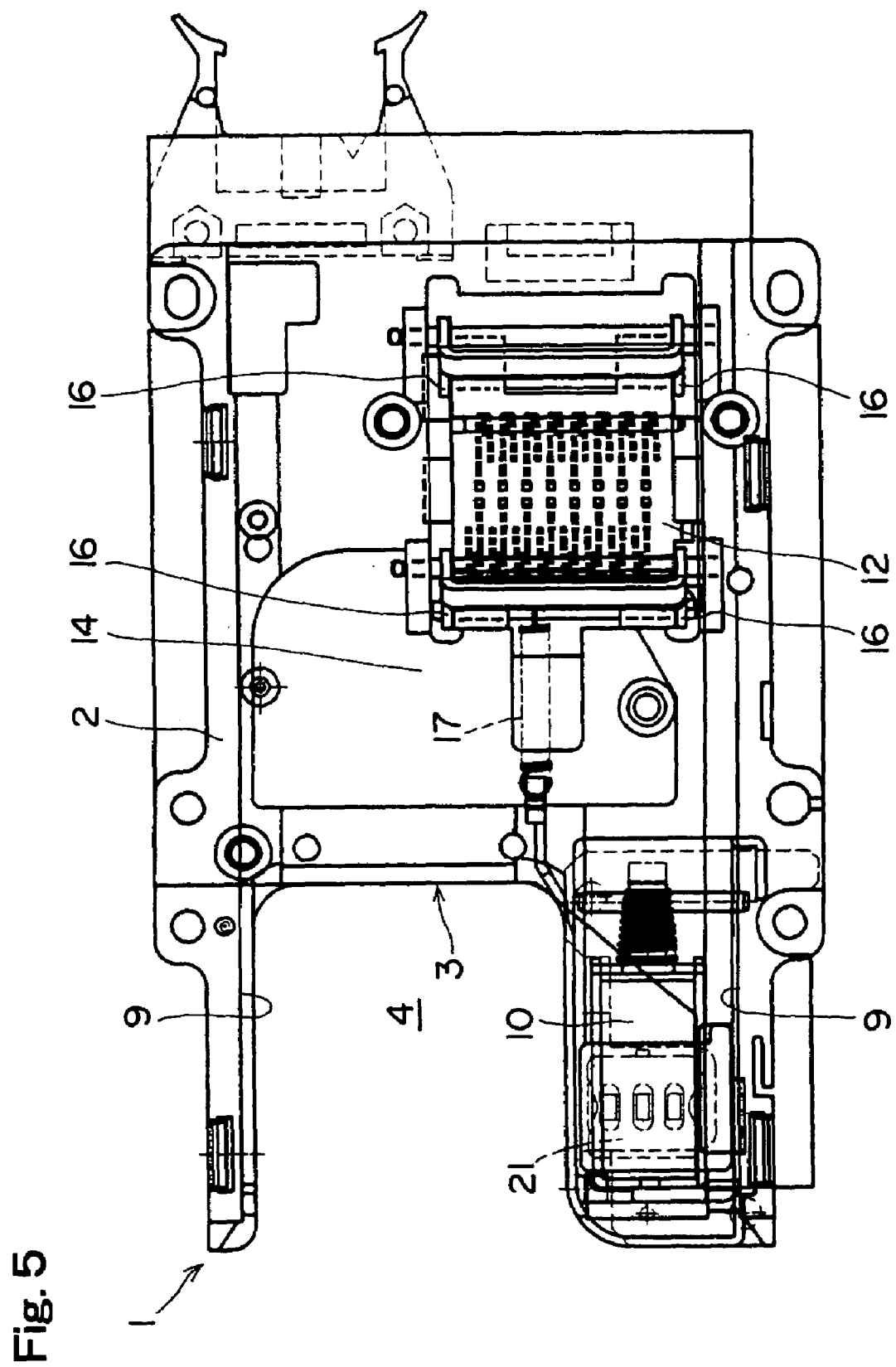
FIG. 5 is a plane view showing the schematic structure of the manual type IC card reader.

The card receiving member 13 receives and supports the rear surface side of the IC card 5 which is pressed from the front surface side when the IC contact springs 11 come into contact therewith, and it can move in the card carriage direction so as to move together with the IC card 5 at the time of insertion and removal of the IC card 5. As shown in FIGS. 1 to 3, the card receiving member 13 in this embodiment is supported at four corners thereof by arms 20 capable of rotating in the card carriage direction, and provided so as to be capable of moving in the card carriage direction and move closer to or away from the card traveling path 14 with this movement. Further, the card receiving member 13 is in contact with the rear surface of the IC card 5 when at least the IC contact springs 11 are in contact with the IC card 5 and, on the other hand, it is retired from the rear surface of the IC card 5 when the IC contact springs 11 are away from the IC card 5. In other words, the card receiving member 13 is provided so as to receive and support a force, which is vertical to the card surface, from the card rear side when the IC card 5 receives this force from the IC contact springs 11.

Furthermore, a pressure receiving portion 18 which protrudes to the card traveling path 14 side is provided at a card insertion direction end of the card receiving member 13, and a return spring 19 which presses this card receiving member 13 in the card return direction is provided on the front side of the card receiving member 13 (see FIGS. 1 to 3). The pressure receiving portion 18 is provided on the card insertion direction side from the pressing portion 8 of the IC contact block 12 and in a range that at least the pressing portion 8 can come into contact therewith. In this embodiment, by providing a gap between the pressing portion 8 and the pressure receiving portion 18 (see FIG. 1), start of movement of the card receiving member 13 is delayed from start of movement of the IC contact block 12 for this gap and a time difference is generated. Therefore, in the IC card reader 1 according to this embodiment, a timing of an increase in an insertion load of the IC card 5 is dispersed for this time difference, and the load is gradually gently increased. Therefore, a card operational feeling felt by a user is improved. Furthermore, since the card insertion load is gently changed, a probability that a magnetic read error is generated is lowered. Moreover, it is preferable that this pressure receiving portion 18 is provided in the vicinity of the card stop position 6 in such a manner that the card receiving member 13 enters a card receiving state immediately before the card stop position 6 like this embodiment (see FIGS. 1 and 3). In this case, since the card receiving member 13 enters the card receiving state immediately before a card insertion completion position, a user can finish the insertion operation without feeling an increase in the insertion load. Additionally, it is preferable that the card receiving member 13 is provided in such a manner that a predetermined contact pressure of the IC contact springs 11 relative to the IC card 5 is applied immediately before the card insertion completion position. In this case, since the predetermined contact pressure of the IC contact springs 11 is applied immediately before the card insertion completion position, a user can finish the insertion operation without feeling an increase in the insertion load if the IC card reader is of a manual type.

Further, a known lock lever 15 which prevents the inserted IC card 5 from coming off is provided to the IC card reader 1. When the IC card 5 is inserted into the card stop position 6, the lock lever 15 swung by a solenoid 10 is caught on a rear end of the IC card 5, prevents the IC card 5 from coming off, and avoids coercive withdrawal of the card in a state that the IC contact springs 11 of the IC contact block 12 are in contact with the contact terminal pattern 22 on the IC card 5.

An operation of the IC card reader 1 having such a structure will now be described.

First, before inserting the card, the IC contact block 12 is pressed in the card return direction by the return spring 17, and the card receiving member 13 is pressed in the same direction by the return spring 19. They are in the retired state as shown in FIG. 1. In this retired state, the pressing portion 8 of the IC contact block 12 and the pressure receiving portion 18 of the card receiving member 13 are separated from each other by a fixed distance as described above, and the card receiving member 13 starts moving after the IC contact block 12 moves for that distance.

Here, although not shown in particular, when the IC card 5 is inserted from the card insertion opening 3, magnetic data recorded in the magnetic stripe of the IC card 5 is first read by the magnetic head 21. The IC card reader 1 detects insertion of the IC card 5 based on this read information.

When the IC card 5 is further inserted, an end of the IC card 5 comes into contact with the pressure receiving portion 7 of the IC contact block 12, and the IC card 5 moves this IC contact block 12 to the inner side (card insertion direction side) while expanding the return spring 17 (see FIG. 2). The IC contact block 12 supported by the arms 16 gradually moves down while moving to the inner side, and approaches the IC card 5 as shown in FIG. 1. However, a contact pressure is not applied to the IC card 5 until the IC contact springs 11 come into contact with the contact terminal pattern 22 and, as a force acting as the card insertion load, there is only an impetus obtained by the return spring 17 except a pad pressure of the magnetic head 21. At this time, since the card receiving member 13 remains in the retired state, no friction is generated between the card receiving member 13 and the IC card 5. Furthermore, the impetus of the return spring 19 is not acting as the card insertion load.

When the IC card 5 is further inserted, the pressing portion 8 of the IC contact block 12 comes into contact with the pressure receiving portion 18 of the card receiving member 13, and thereafter the card receiving member 13 also moves to the inner side together with the IC contact block 12 (see FIG. 2). At this time, the card receiving member 13 supported by the arms 20 gradually moves up while moving to the inner side, approaches the rear surface of the IC card 5, and enters the card receiving state immediately before the card stop position 6.

As described above, when the IC contact block 12 moves down, the IC contact springs 11 come into contact with the contact terminal pattern 22 on the IC card 5. In this case, although the IC card 5 is pressed to the card receiving member 13 side, it does not generate a sliding friction between itself and the card receiving member 13 which approaches while moving by the same distance to the inner side. That is, in this embodiment, the card receiving member 13 gradually approaches the IC card 5 while integrally moving with the IC card 5 without generating a displacement in the card carriage direction, and it does not give a frictional resistance to the IC card 5. Therefore, even if the IC card 5 is pressed to the card receiving member 13 side by the IC contact springs 11, the load at the time of insertion of the IC card 5 can be suppressed. Therefore, a force required to insert the IC card 5 is not suddenly increased in the middle of insertion.

When the IC card 5 is inserted into the card stop position 6, the IC contact block 12 moves down to a position shown in FIG. 3 and enters a state that the IC contact springs 11 are assuredly in contact with the contact terminal pattern 22. Moreover, the solenoid 10 is operated, and the IC card 5 is locked by the lock lever 15. Thereafter, data communication is performed between the IC contact springs 11 and the contact terminal pattern 22.

Upon terminating the data communication, lock of the IC card 5 by the lock lever 15 is released, and a user can withdraw the IC card 5. When the IC card 5 is withdrawn, the IC contact block 12 is pulled back by the return spring 17, moves away from the card traveling path 14, and returns to the retired state shown in FIG. 1. Additionally, the card receiving member 13 is also pulled back by the return spring 19, moves away from the card traveling path 14 and returns to the retired state.

As described above, in this IC card reader 1, since the insertion load received during insertion of the IC card 5 can be prevented from being greatly increased in the middle of insertion, an operational feeling at the time of insertion of the card can be improved. That is, in this IC card reader 1, although the IC contact block 12 is caused to approach the card traveling path 14 with the insertion operation of the IC card 5, the card receiving member 13 which receives and supports the card rear surface is moved by the same distance as that of this IC card 5, and the insertion load of the IC card 5 can be reduced by eliminating the frictional resistance. Therefore, a force required to insert the card can be prevented from being greatly changed, and the operational feeling at the time of inserting the card can be improved.

Further, since a great change in the insertion load in the middle of inserting the card can be avoided, and a user can be prevented from taking a position during insertion of the card for a card insertion completion position. Therefore, the IC card 5 can be completely inserted into the card stop position 6, and the IC contact springs 11 can be readily correctly and assuredly come into contact with predetermined positions on the contact terminal pattern 22.

Figure 9:
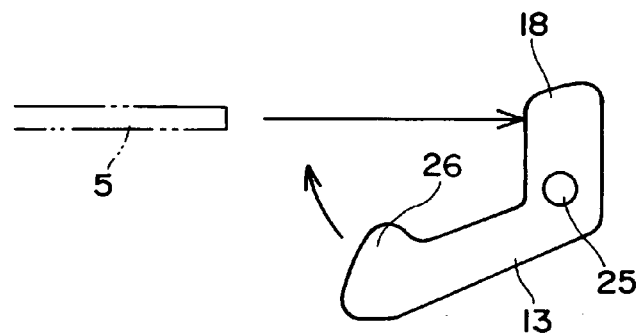
FIG. 9 is a view showing an example of the rotatable card receiving member.
Figure 10:
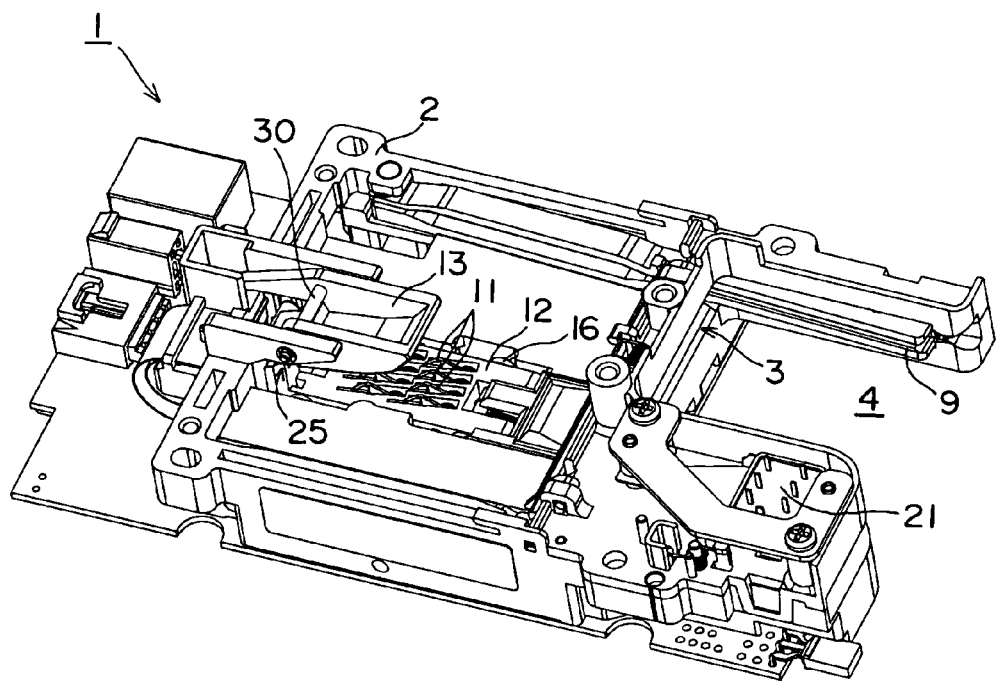
FIG. 10 is a perspective view showing a structure of a manual type IC card reader on a bottom surface side in a second embodiment according to the present invention.
Figure 11:
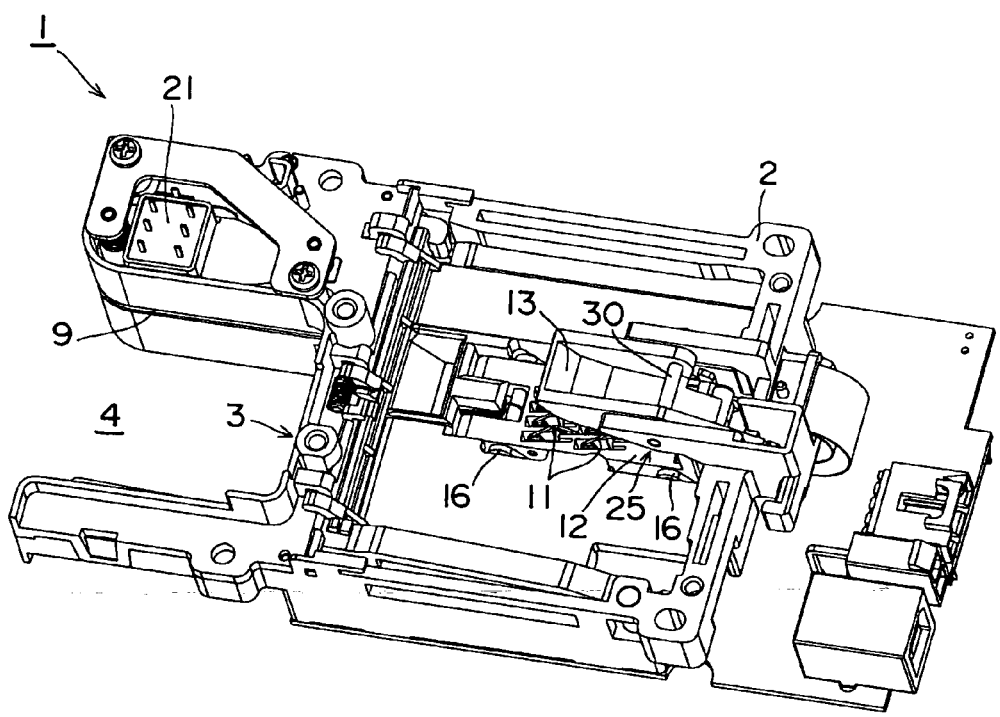
FIG. 11 is a perspective view showing the IC card reader depicted in FIG. 10 from another position.
Figure 12:
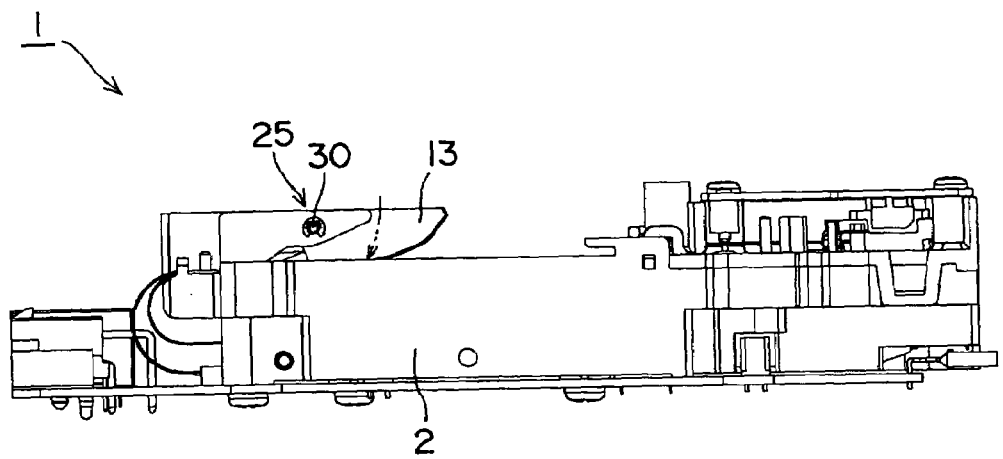
FIG. 12 is a side view of the IC card reader depicted in FIG. 11.
Figure 13:
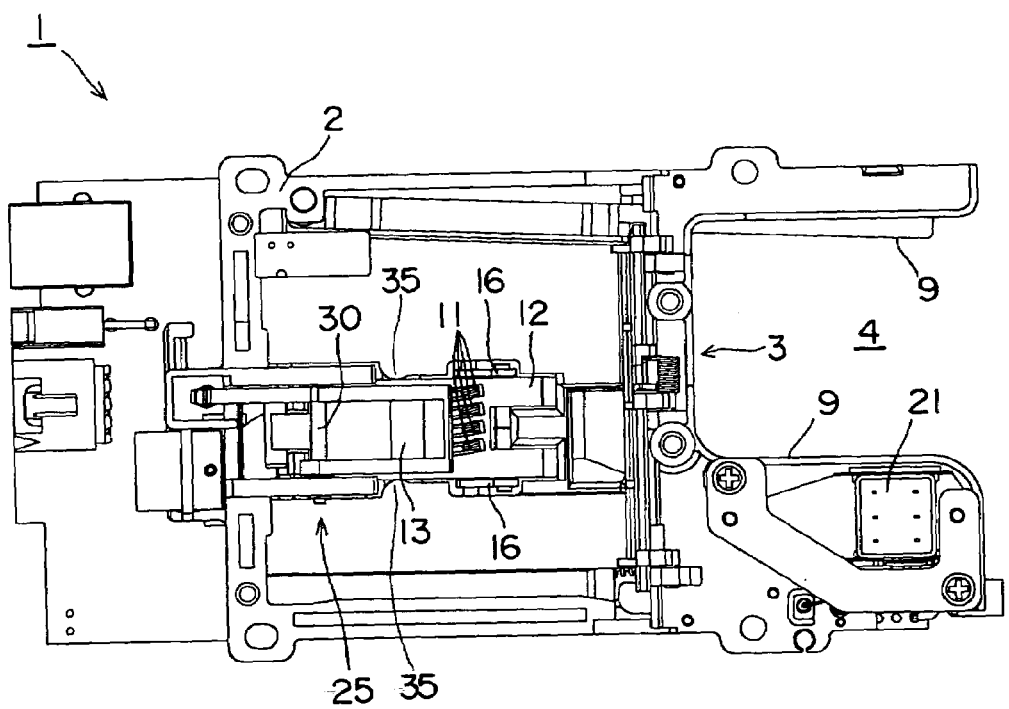
FIG. 13 is a bottom view of the IC card reader.
Figure 14:
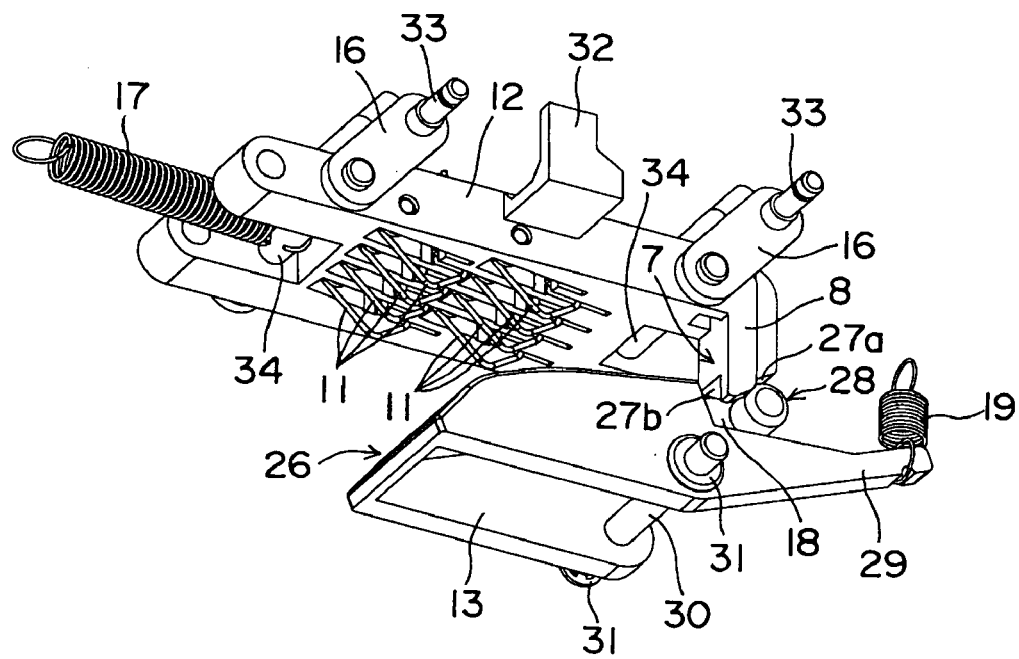
FIG. 14 is a perspective view showing a structure of an IC contact block and a card receiving member in a retired state.
Figure 15:
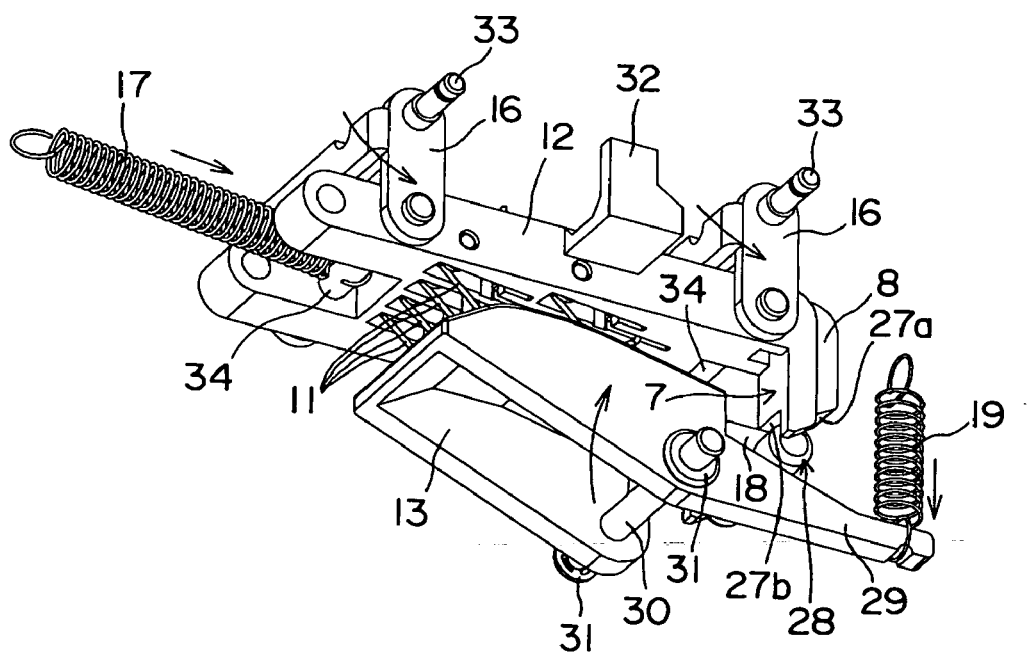
FIG. 15 is a perspective view showing the IC contact block and the card receiving member in a contact state without illustrating an IC card.

A second embodiment according to the present invention will now be described. Although the card receiving member 13 is moved while being kept in parallel by utilizing the arms 20 in the above-described embodiment, the card receiving member 13 is not restricted to such a type. For example, as shown in FIG. 9, an L-shaped card receiving member 13 which is bent halfway is provided so as to be capable of rotating around a supporting point 25, and one end side can function as the pressure receiving portion 18 whilst the other end side can serve as a support portion 26 which comes into contact with the rear surface of the IC card 5. When the pressure receiving portion 18 is directly pushed by the IC card 5 or pushed by the pressing portion 8 of the IC contact block 12, such a card receiving member 13 rotates around the supporting point 25 as indicated by an arrow, presses the support portion 26 against the card rear surface, and receives and supports the IC card 5 which is pushed from the front surface side by the IC contact springs 11. In this case, it is preferable that the card receiving member 13 is brought into contact with the card rear surface and caused to receive and support the IC card 5 when the IC contact springs 11 and the IC card 5 come into contact with each other, thereby preventing a sudden increase in the insertion load caused due to the card insertion operation.

FIGS. 10 to 19 show the second embodiment of the IC card reader 1. This IC card reader 1 is a manual type card reader like the first embodiment, includes a card insertion/removal concave portion 4 in the card return direction of the frame 2 forming the card insertion opening 3, causes the IC contact block 12 to approach the card traveling path 14 with the insertion operation of the IC card 5 inserted from the card insertion opening 3 to the card stop position 6, and brings the IC contact springs 11 into contact with the contact terminal pattern 22 on the surface of the IC card 5. Guide members 35 which avoid horizontal oscillation of the IC contact block 12 are provided on both sides of the IC contact block 12 (see FIG. 13). Furthermore, reference numerals 32 denote a light shielding member which is integrated with the IC contact block 12 and shuts off a non-illustrated photo-interrupter; 33, a pin which supports each arm 16; and 34, a pin which rotatably connects each arm 16 with the IC contact block 12. It is to be noted that the IC card reader 1 is shown in a state reversed from the first embodiment in FIGS. 10 to 12.

In this embodiment, the card receiving member 13 is provided so as to be capable of rotating around the supporting point 25 on the frame 2. Moreover, in this IC card reader 1, it is characterized that at least a part of a portion of the pressing portion 8 of the IC contact block 12 which comes into contact with the pressure receiving portion 18 of the card receiving member 13 is so provided that the pressure receiving portion 18 of the card receiving member 13 can move onto the part and the part is a horizontal surface 27b which does not produce a component force in the card return direction acting on the IC contact block 12 from the card receiving member 13 when the IC card 5 stops at the card stop position 6.

The card receiving member 13 is provided as means for receiving and supporting the IC card 5 with which the IC contact springs 11 are in contact, from the rear surface side. However, as different from the first embodiment in which the card receiving member 13 moves in parallel, the card receiving member 13 in this embodiment can rotate around the supporting point 25 on the frame 2 (see FIG. 12 and others). To the supporting point 25 are provided, e.g., a support pin 30 which rotatably supports the card receiving member 13 and a snap ring 31. It is preferable that the support portion 26 of this card receiving member 13 which comes into contact with the card rear surface has a shape which receives and supports the IC card 5 on a surface which is as large as possible in order to realize receiving and supporting in a further stable state (see FIG. 16 and others). For example, the support portion 26 is formed of a curved surface or a plurality of flat surfaces whose angles are changed little by little. Moreover, it is preferable that the support portion 26 has a shape which does not come into contact with the card rear surface until the IC card 5 is completely inserted. It is to be noted that the rear side of the support portion 26 has a hollow shape in order to reduce a weight in this embodiment (see FIG. 14 and others). Additionally, an arm 29 which extends in the card insertion direction is provided on the side opposite to the support portion 26 of the card receiving member 13. An end of the return spring 19 such as a coil spring which gives an impetus to the card receiving member 13 so as to be in the retired state (see FIGS. 14 and 16) away from the rear surface of the IC card 5 is hooked on this arm 29.

Figure 16:
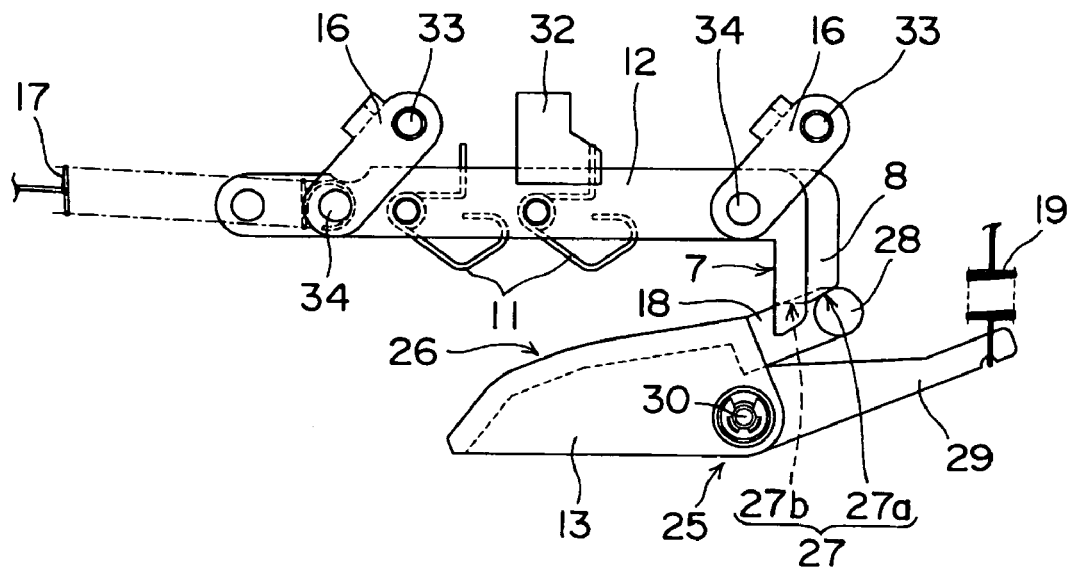
FIG. 16 is a side view showing the IC contact block and the card receiving member in the retired state.
Figure 17:
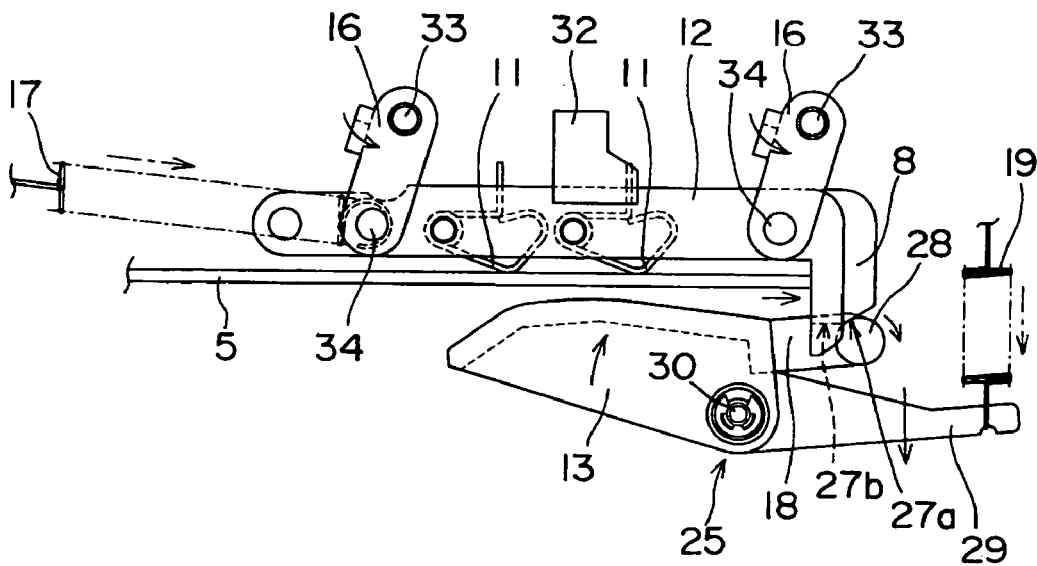
FIG. 17 is a side view showing the IC contact block and the card receiving member in the middle of a card insertion operation.
Figure 18:
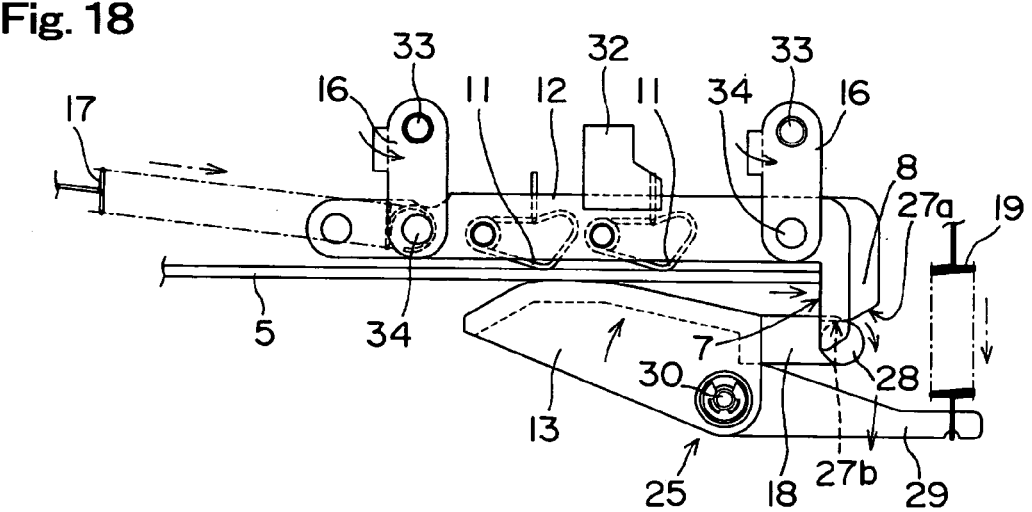
FIG. 18 is a side view showing the IC contact block and the card receiving member in the contact state.
Figure 19:
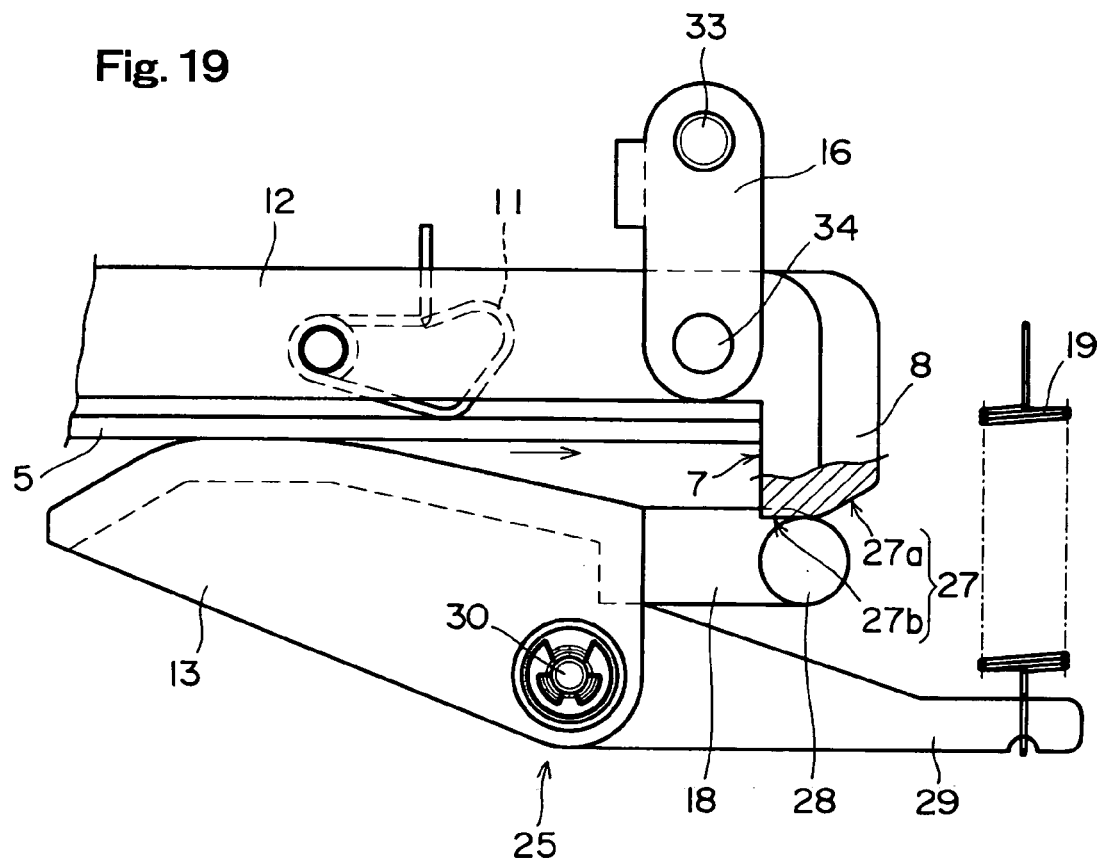
FIG. 19 is a partially enlarged view of the IC contact block and the card receiving member depicted in FIG. 18.

The pressure receiving portion 18 of the card receiving member 13 follows up the movement of the pressing portion 8 of the IC contact block 12, and it is provided so as to rotate the card receiving member 13 from the retired state shown in FIG. 16 to a state illustrated in FIG. 18, i.e., a contact state that the rear surface of the IC card 5 is received and supported. The pressure receiving portion 18 in this embodiment does not protrude to the card traveling path 14, and it is provided so as to engage with only the pressing portion 8 of the IC contact block 12. Further, a follower 28 which follows up the pressing portion 8 of the IC contact block 12 is provided at an end portion of the pressure receiving portion 18. It is preferable that at least the part of the follower 28 which comes into contact with the pressing portion 8 has a curved surface shape or is constituted of a rotatable roller, thereby increasing the follow-up properties relative to the pressing portion 8.

The pressure receiving portion 7 of the IC contact block 12 is provided in such a manner that an end of the IC card 5 comes into contact therewith, and the pressing portion 8 is provided so as to rotate the card receiving member 13 through the above-described pressure receiving portion 18. In this embodiment, an end portion of the IC contact block 12 on the card insertion direction side is caused to protrude to the card traveling path 14 side, and a surface of this protrusion portion on the card return direction side is determined as the pressure receiving portion 7, a part of the same which comes into contact with the pressure receiving portion 18 is determined as the pressing portion 8. Further, a cam surface 27 which is constituted of an inclined surface 27*a* and a horizontal surface 27*b* and guides the above-described follower 28 is formed to the pressing portion 8 (see FIGS. 15 and 16). Specifically, the card insertion direction side of the cam surface 27 is determined as the inclined surface 27*a*, and the card return direction side of the same is determined as the horizontal surface 27*b* which is continuous with the inclined surface 27*a*. The follower 28 provided to the card receiving member 13 is in contact with the inclined surface 27*a* of the cam surface 27 when the card receiving member 13 is in the retired state (see FIGS. 14 and 16), rotates the card receiving member 13 by moving along this inclined surface 27*a* as this cam surface 27 moves in the card insertion direction (see FIG. 17), and thereafter moves onto the horizontal surface 27*b* (see FIGS. 18 and 19). When the follower 28 moves onto and engages with the horizontal surface 27*b*, the card receiving member 13 cannot rotate in that state.

Here, a moment to rotate in the counterclockwise direction in FIG. 18, i.e., a moment in a direction to return from the contact state to the retired state acts on the card receiving member 13 in the contact state (see FIGS. 18 and 19) by a tensile force of the return spring 19 and an elastic force of the IC contact springs 11. Assuming that this moment is transmitted from the follower 28 of the pressure receiving portion 18 to the inclined surface 27*a* of the cam surface 27, a component force in the card return direction is generated on this inclined surface 27*a*. Therefore, a force to push back in the card return direction can possibly act on the IC contact block 12 and the IC card 5. On the other hand, in case of this embodiment, a pushing force received by the cam surface 27 from the follower 28 acts in only a direction vertical to the card carriage direction by completely moving the follower 28 onto the horizontal surface 27*b* and engaging it with the same in the contact state, thereby preventing a component force horizontal with respect to the card carriage direction from being generated (see FIGS. 18 and 19). Therefore, the IC contact block 12 does not receive the force in the card return direction from the card receiving member 13 in the contact state. Therefore, according to the IC card reader 1 of this embodiment, an unnecessary force to push back in the card return direction can be prevented from acting on the completely inserted IC card 5, and the IC card 5 can be kept being held at the card stop position 6. It is to be noted that the component force in the card return direction acting on the IC contact block 12 from the card receiving member 13 is not generated at all in this embodiment, but it may be slightly produced depending on situations. That is, although the horizontal surface 27*b* is formed so as to be horizontal to the card carriage direction in this embodiment, the IC contact block 12 and the IC card 5 can be kept in the contact state even if the horizontal surface 27*b* is slightly obliquely formed and a component force in the horizontal direction is generated. Even if the component force which returns the IC card 5 in the card return direction is generated, a shape of the horizontal surface 27*b* which generates only a small component force by which the IC card 5 cannot be returned can keep holding the IC card 5 at the card stop position 6 like this embodiment.

Furthermore, in such an IC card reader 1, it is desirable that the IC contact block 12 and the card receiving member 13 are necessarily automatically returned to their initial positions, i.e., the retired state when the IC card 5 is pulled out. In this embodiment, the return force acting on the IC contact block 12 in the card return direction exceeds the resistance force acting in the card insertion direction when pulling out the card, and the IC contact block 12 is thereby automatically returned to its original position. Giving a specific explanation, the return force in this case is a resultant force of the frictional force generated between the IC card 5 and the IC contact springs 11 and the impetus generated by the return spring 17, and the resistance force is a frictional force generated between the horizontal surface 27*b* and the follower 28. The return force is set so as to exceed the resistance force. It is to be noted that the engagement state of the horizontal surface 27*b* with the follower 28 is released when the IC contact block 12 moves in the card return direction. As a result, the card receiving member 13 can again rotate, and is automatically returned to the retired state by the impetus of the return spring 19.

It is to be noted that the foregoing embodiments are preferred modes of the present invention, but the present invention is not restricted thereto, and various kinds of modifications can be carried out without departing from the scope of the invention.

Figure 6:
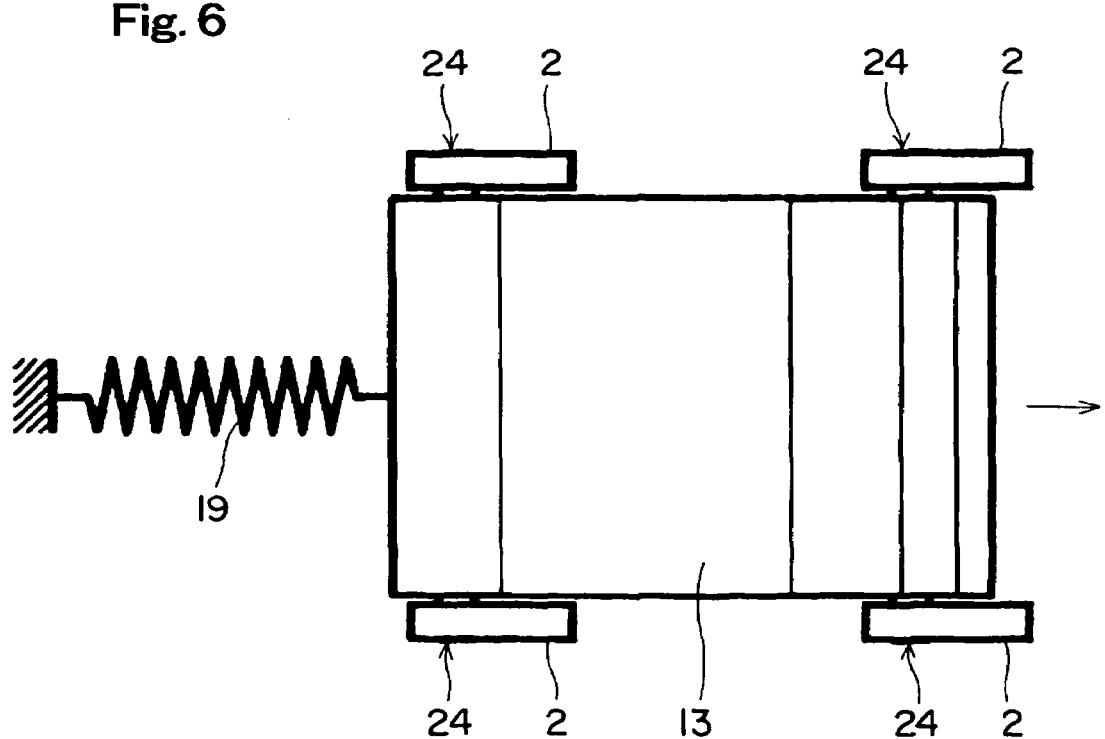
FIG. 6 is a plane view of a card receiving member of the IC card reader which guides the card receiving member by using a cam groove in an oblique direction.
Figure 7:
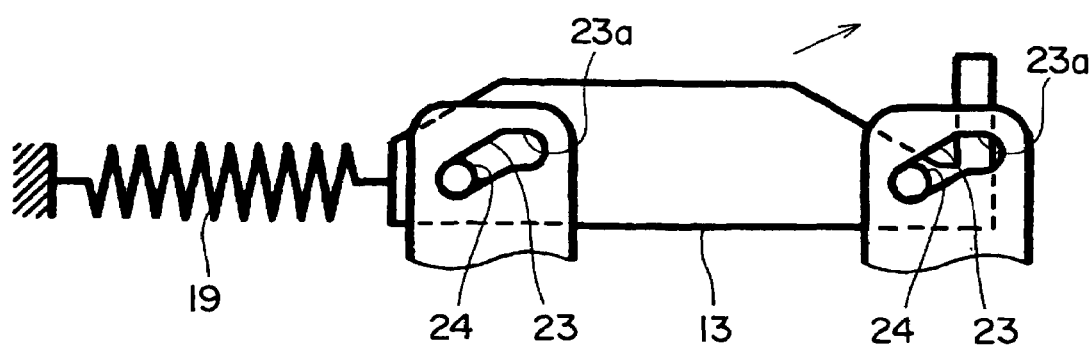
FIG. 7 is a side view of FIG. 6.

For example, although the card receiving member 13 is moved in parallel by utilizing the arms 20 capable of rotating in the first embodiment, the card receiving member 13 may be moved closer to or away from the card traveling path 14 while moving it in the card carriage direction by providing cam grooves 23 in the oblique direction to the frame 2 of the card reader main body and guiding pins 24 formed to the side portions of the card receiving member 13 by using the cam grooves 23 as shown in FIGS. 6 and 7. According to this IC card reader 1, the number of components can be decreased, and the cost can be suppressed. Incidentally, it is preferable that horizontal portions 23*a* which facilitate holding the card receiving member 13 in the card receiving state are provided to the cam grooves 23 on the card insertion direction side.

Moreover, in the first and second embodiments, the operational feeling felt by a user during a manual operation is improved by reducing the load when inserting the card or by preventing a sudden increase in the load in the manual type IC card reader 1, and an interruption of the operation in the middle of insertion of the card is prevented. However, the present invention is not restricted to such a manual type IC card reader 1, and it may be applied to, e.g., a motor type IC card reader, i.e., an IC card reader which automatically carries the IC card 5 in the card carriage direction by utilizing a drive force of a motor. In this case, since a card carriage force can be suppressed, the load applied on the motor can be reduced, and a motor consumption current can be suppressed.

Figure 20:
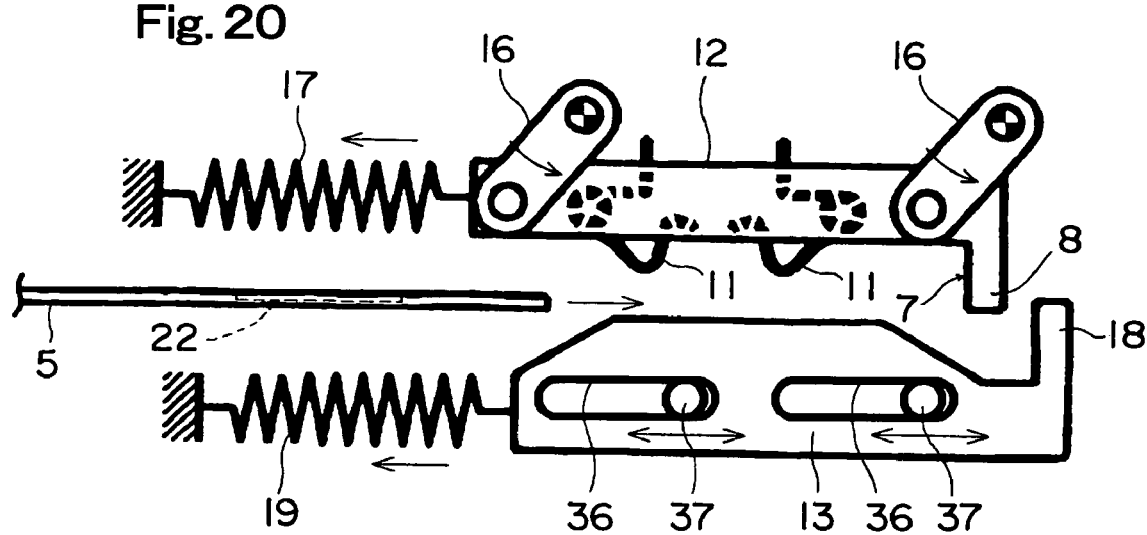
FIG. 20 is a schematic view of an inside of an IC card reader according to another embodiment of the present invention.
Figure 21:
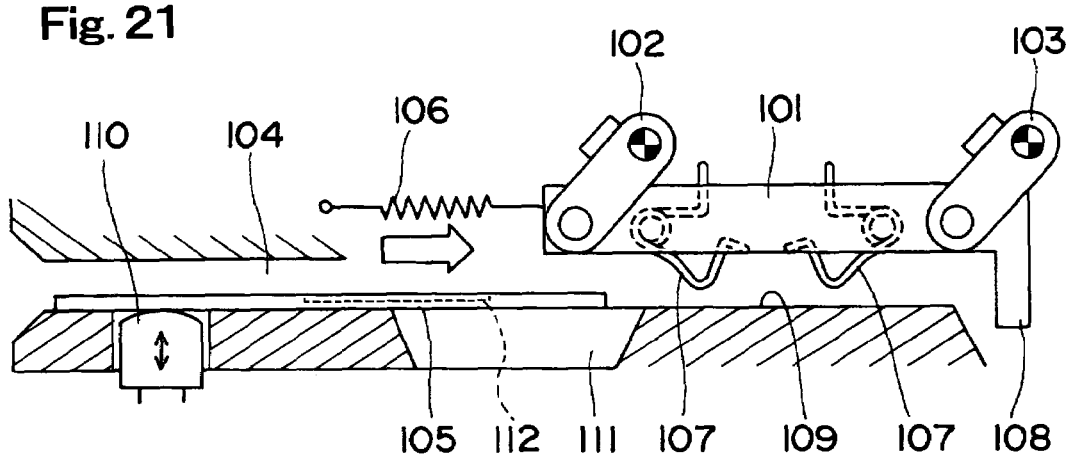
FIG. 21 is a view showing an IC contact block before inserting an IC card in a conventional IC card reader.
Figure 22:
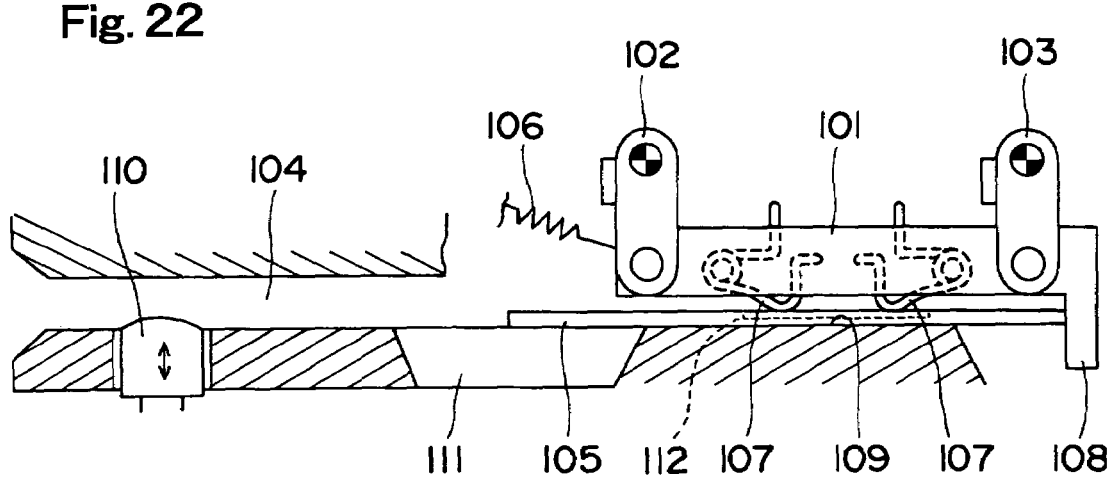
FIG. 22 is a view showing an IC contact block when the IC card is inserted to a card stop position in the conventional IC card reader.

Additionally, in the above-described first and second embodiments, the description has been given as to the card receiving member 13 which entirely or partially moves in the card carriage direction and moves closer to or away from the card traveling path 14 as the preferred embodiments of the IC card reader 1. However, even if this card receiving member 13 can horizontally move only in the card carriage direction, a sudden increase in the card insertion load can be prevented. For example, as shown in FIG. 20, even if lateral holes 36 extending in the card carriage direction are respectively provided at two positions on the front and rear parts and the card receiving member 13 can horizontally move only in the card carriage direction by guide pins 37 passing through the lateral holes 36, providing the card receiving member 13 so as to start horizontally moving together with the IC card 5 when the IC contact springs 11 come into contact with the IC card 5 and the load starts to increase can eliminate the frictional resistance generated between the card receiving member 13 and the rear surface of the IC card.

Further, although the description has been given as to the card receiving member 13 having the pressure receiving portion 18 so as to work with the IC card 5 in the first and second embodiments, the card receiving member 13 including no pressure receiving portion 18 may be adopted. Although not shown in particular, for example, a solenoid driven type or a motor driven type may be used, and the card receiving member 13 may be moved by such a solenoid or a motor. As the solenoid driven type, there is, e.g., a mechanism which detects completion of insertion of the IC card by using a sensor such as a photo-interrupter or a micro switch and moves up the card receiving member 13 from the retired position to a position where the IC card 5 is received and supported by using a solenoid when the sensor is turned on. As the motor driven type, there is a mechanism using a motor in place of the solenoid.

Further, although the description has been given as to the preferred example that the present invention is applied to the IC card reader 1 including the IC contact block 12 which moves while keeping the parallelism and the rotatable card receiving member 13 in the second embodiment, but the IC card reader 1 to which the present invention can be applied is not restricted thereto. For example, the present invention can be also applied to the IC card reader 1 described as the first embodiment, i.e., the IC card reader 1 in which both the IC contact block 12 and the card receiving member 13 are supported by the arms 16 and 20 and move in parallel (see FIGS. 1 to 3), or the IC card reader 1 in which the card receiving member 13 obliquely moves in parallel by the cam grooves 23 (see FIGS. 6 and 7), and the component force in the card return direction acting on the IC contact block 12 from the card receiving member 13 can be prevented from being generated or can be reduced. However, since the IC card reader 1 described in connection with the first embodiment has a structure that the IC contact block 12 and the card receiving member 13 gradually move closer to each other in the process of changing from the retired state to the contact state, it is hard to move the follower 28 onto the horizontal surface 27b of the cam surface 27 only in the contact state. Thus, in this case, by enabling expansion and contraction of one or both of the pressing portion 8 and the pressure receiving portion 18 in the perpendicular direction, the follower 28 can be moved onto the horizontal surface 27b while the IC contact block 12 and the card receiving member 13 move closer to each other.

(Embodiment)

Figure 8:
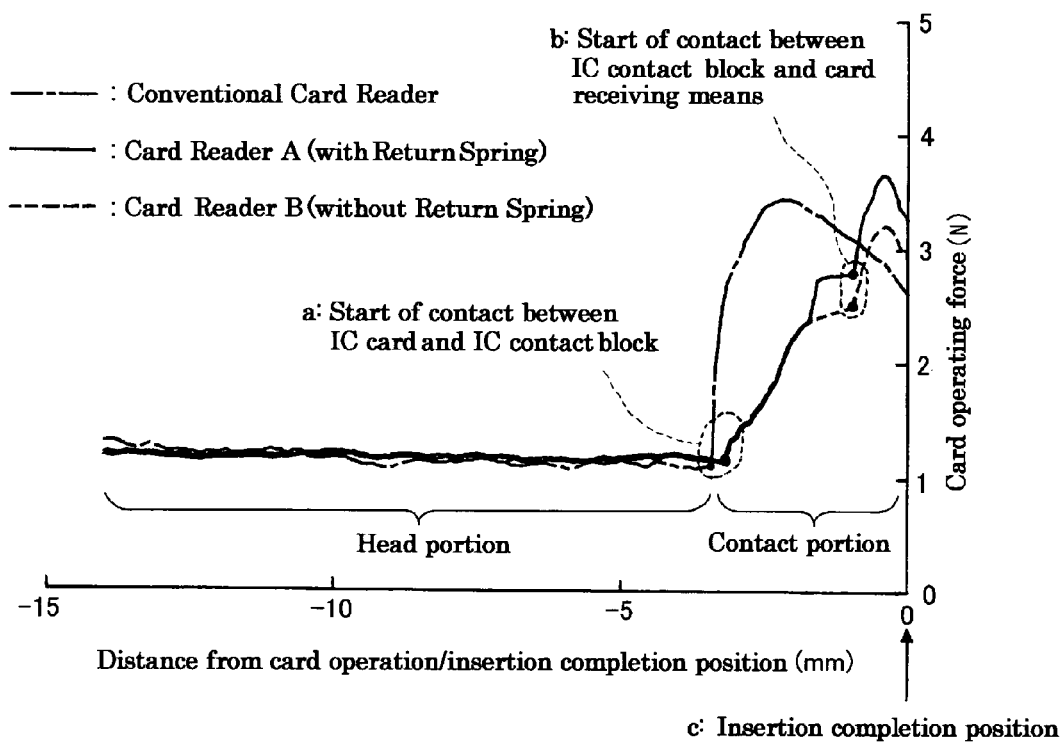
FIG. 8 is a graph showing a load fluctuation measurement result example when inserting a card in the IC card reader.

Manual type IC card readers 1 were manufactured by way of trial, and fluctuations in load when inserting a card were examined (see FIG. 8). In the manual type IC card readers A and B as trial products, the card receiving member 13 was designed to start moving upon movement of the IC contact block 12 by 2 mm, and enter the card receiving state immediately before a card insertion completion position c. Furthermore, the same IC card 5 and magnetic head 21 were used, the IC card 5 was inserted by using a tensile tester, and a load was measured from a position away from the card insertion completion position c by approximately 14 mm on the front side to the insertion completion position c. Here, the prototype card reader (IC card reader A) having the return spring 19 provided thereto and the prototype card reader (card reader B) having no return spring 19 provided thereto were manufactured by way of trial, and their measurement test results were compared with that of a conventional card reader.

FIG. 8 shows measurement results of fluctuations in load. In FIG. 8, a "contact portion" represents a part from a point a where the IC card 5 and the IC contact block 12 start to come into contact with each other to the insertion completion position c, and a "head portion" represents a part from a card insertion start position to the contact start point a. A point b represents a point where the IC contact block 12 and the card receiving member 13 start to come into contact with each other. From this drawing, it can be understood that a sudden increase in an operating force in the contact portion is eminently shown in the conventional card reader but a load increase ratio is eased in the prototype card reader having the movable card receiving member 13 provided thereto. This is a level that an improvement effect can be grasped even from a hand sense.

Ratio of increase in the insertion load (maximum value in the contact portion) relative to a card movement distance will now be described.

| | |
|---|---|
| Conventional card reader | 2.11/1.3 ≈ 1.62 N/mm |
| Card reader A (with return spring) | 2.82/2.8 ≈ 10.0 N/mm |
| Card reader B (without return spring) | 1.87/2.8 ≈ 0.67 N/mm |

It was understandably confirmed that the index is greatly reduced. Moreover, it was also revealed that a difference in index based on presence/absence of the return spring 19 is large.

The invention claimed is:

1. An IC card reader which moves an IC contact block closer to a card traveling path with an insertion operation of an IC card which is inserted into a card stop position from a card insertion opening formed on a frame front side, brings IC contact springs into contact with a contact terminal pattern on a surface of the IC card, and receives and directly supports the IC card with which the IC contact springs have been in contact by a card receiving member from a rear surface side of the IC card, wherein the card receiving member opposed to the IC contact block with the card traveling path therebetween is provided so as to be rotatable around a supporting point on the frame at the time of an IC card insertion operation and an IC card return operation, and receives and supports the IC card from the rear surface side when at least the IC contact springs are in contact with the surface of the IC card; a pressure receiving portion with which an end of the IC card comes into contact and a pressing portion which comes into contact with the card receiving member are formed to the IC contact block; a pressure receiving portion with which the pressing portion comes into contact is formed to the card receiving member; at least a part of the pressing portion of the IC contact block which comes into contact with the pressure receiving portion of the card receiving member is so provided that the pressure receiving portion of the card receiving member moves onto the part from a location at a gap with the part, and the part is a horizontal surface which does not produce a component force in a card return direction acting on the IC contact block from the card receiving member when the IC card stops at the card stop position.

2. An IC card reader which moves an IC contact block closer to a card traveling path with an insertion operation of an IC card which is inserted into a card stop position from a card insertion opening formed on a frame front side, brings IC contact springs into contact with a contact terminal pattern on a surface of the IC card, and receives and directly supports the IC card with which the IC contact springs have been in contact by a card receiving member from a rear surface side of the IC card, wherein the card receiving member opposed to the IC contact block with the card traveling path therebetween is provided so as to be rotatable around a supporting point on the frame at the time of an IC card insertion operation and an IC card return operation, and receives and supports the IC card from the rear surface side when at least the IC contact springs are in contact with the surface of the IC card; a pressure receiving portion with which an end of the IC card comes into contact and a pressing portion which comes into contact with the card receiving member are formed to the IC contact block; a pressure receiving portion with which the pressing portion comes into contact is formed to the card receiving member; a cam surface which is constituted of an inclined surface and a horizontal surface and guides the pressure receiving portion of the card receiving member is formed to the pressing portion of the IC contact block, and a follower which comes into contact with the cam surface and guided is formed to the pressure receiving portion of the card receiving member, the follower moves onto the cam surface, and the follower moves onto the horizontal surface when the IC card stops at the card stop position.

3. An IC card reader according to claim 2, wherein a part of the follower which comes into contact with the cam surface is a curved surface.

4. An IC card reader according to claim 2, wherein the follower is constituted of a roller.

* * * * *